United States Patent [19]

Shigenaka et al.

[11] Patent Number: 4,799,461
[45] Date of Patent: Jan. 24, 1989

[54] WASTE HEAT RECOVERY BOILER
[75] Inventors: Toshinori Shigenaka; Iwao Kusaka, both of Kure, Japan
[73] Assignee: Babcock Hitachi Kabushiki Kaisha, Tokyo, Japan
[21] Appl. No.: 163,514
[22] Filed: Mar. 2, 1988
[30] Foreign Application Priority Data
  Mar. 5, 1987 [JP]  Japan .................................. 62-48793
[51] Int. Cl.[4] .............................................. F22D 1/00
[52] U.S. Cl. ...................................... 122/7 R; 122/1 C; 122/420; 165/13
[58] Field of Search ............... 122/7 R, 7 C, 1 C, 412, 122/420; 165/13

[56] References Cited
U.S. PATENT DOCUMENTS
  4,489,679  12/1984  Holt .................................. 122/420 X
  4,491,093  1/1985   Hoekstra ........................ 122/1 C X
  4,572,110  2/1986   Haeflich ............................ 122/7 R
  4,660,511  4/1987   Anderson ........................... 122/420

Primary Examiner—Edward G. Favors
Attorney, Agent, or Firm—Antonelli, Terry & Wands

[57] ABSTRACT

A waste heat recovery boiler comprising heat exchange rate switching means for controlling the rate of heat exchange between an exhaust gas and feedwater in a heat exchanger by changing the state of the feedwater in accordance with the concentration of sulfur oxides in the exhaust gas, thereby maintaining the temperature at which low temperature corrosion due to the exhaust gas is prevented in a downstream portion of the heat exchanger in the direction in which the exhaust gas flows. Accordingly, it is possible to achieve the maximum efficiency of heat recovery since the phenomenon of steaming in the heat exchanger is eliminated irrespective of whether the kind of exhaust gas is a dirty gas or a clean gas.

8 Claims, 8 Drawing Sheets

WASTE HEAT RECOVERY BOILER

BACKGROUND OF THE INVENTION

1. Field of the Invention

The present invention relates generally to waste heat recovery boilers used in combined power plants and, more particularly, to a waste heat recovery boiler which can be adapted to deal with exhaust gases containing sulfur oxides (SOx) as well as those containing no sulfur oxides.

2. Description of the Prior Art

To cope with the rapid increase in electric power demand, thermal power plants having a large capacity have been constructed. In general, the boilers used in such thermal power plant are required to perform a sliding pressure operation in order to attain a high power generation efficiency under the condition of a partial load operation.

An outstanding feature of recent trends in the demand for electric power resides in the fact that an increase in the amount of power generated by atomic power plants enlarges the difference between the maximum and minimum load variations. For this reason, there is a tendency for thermal power plants to be shifted from base load operations to load adjustment operations.

More specifically, in the case of a load adjustment operation, few thermal power plants are operated with boilers operated under the condition of a normally full load. Typical thermal power plants are repeatedly stopped and started while the level of boiler load is being increased and decreased within the range of from 75% load to 50% load to 25% load. That is to say, thermal power plants are commonly used in a so-called daily start stop (hereinafter referred to simply as "DSS") operation to support a medium load. In such DSS operations, thermal power plants are only used during the daytime while electric power demand is high, and at night are stopped; this improves the efficiency of power generation.

For example, combined power plants have recently attracted attention as a highly efficient form of electric power generation. In such a combined power plant, the generation of electric power is performed by first generating electricity by means of a gas turbine, then recovering the heat possessed by the exhaust gases discharged from the gas turbine by means of a waste heat recovery boiler, and then actuating a steam turbine by using the steam generated by the waste heat recovery boiler.

In this manner, the combined power plant utilizes a combination of power generation employing the gas turbine and power generation employing the steam turbine. Accordingly, the combined power plants feature a highly efficient form of power generation as well as the excellent load response which is the characteristic of gas turbines. Therefore, such a combined power plant is capable of coping with the rapid increase and decrease in electric power demand, and hence excels in terms of its capability to follow up load variations. For these reasons, combined power plants are well suited to the DSS operations.

Figure 13:
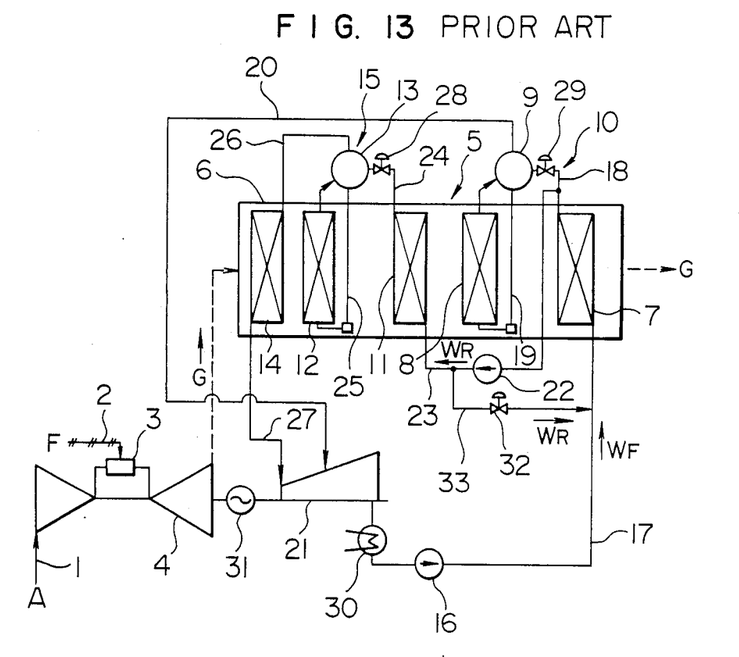
FIG. 13 is a system diagram illustrating the overall system of a typical example of a combined power plant which relies upon the prior art.

FIG. 13 is a system diagram illustrating the overall system of a typical example of the combined power plant of the prior art.

As illustrated, a fuel air A supplied through an air supply pipe 1 and a fuel F supplied through a fuel supply pipe 2 are mixed and burned in a combustor 3, and the resultant combustion gas causes the rotor of a gas turbine 4 to rotate, thereby generating electric power. After the combustion gas has been utilized in the gas turbine 4, the gas is introduced as an exhaust gas G into an exhaust gas passage 6 of a waste heat recovery boiler 5. A low pressure boiler 10 and a high pressure boiler 15 are arranged along the exhaust gas passage 6 from its downstream side to the upstream side. The low pressure boiler 10 includes a low pressure economizer 7, a low pressure evaporator 8 and a low pressure drum 9, and the high pressure boiler 15 includes a high pressure economizer 11, a high pressure evaporator 12, a high pressure drum 13 and a superheater 14.

Feedwater WF which serves as a fluid to be heated is supplied by a feedwater pump 16 through a feedwater pipe 17 to the low pressure economizer 7. After being preheated to a predetermined temperature in the low pressure economizer 7, the feedwater WF is supplied through a drum feedwater pipe 18 to the low pressure drum 9.

The feedwater WF supplied to the low pressure drum 9 is naturally or forcibly recycled through a low pressure descending pipe 19, the low pressure evaporator 8 and the low pressure drum 9. During this recycling, the feedwater WF is heated and separated into water and steam in the low pressure drum 9. The thus-separated water is further recycled through the low pressure descending pipe 19, the low pressure evaporator 8 and the low pressure drum 9, while the steam is supplied through a main steam pipe 20 to a steam turbine 21.

In the meantime, high temperature water WR which is made to branch off at the outlet of the low pressure economizer 7 is partially supplied to the high pressure economizer 11 through a high pressure feedwater pipe 23 by means of a boiler feedwater pump 22. After being heated to a predetermined temperature in the high pressure economizer 11, the high temperature water WR is supplied through a drum feedwater pipe 24 to the high pressure drum 13.

As with the low pressure boiler 10, the feedwater supplied to the high pressure drum 13 is recycled through a high pressure descending pipe 25, the high pressure evaporator 12 and the high pressure drum 13. During this recycling, the feedwater is separated into water and steam in the high pressure drum 13. The thus-separated steam is supplied through a drum steam outlet pipe 26 to the superheater 14. After the temperature of the steam is further raised in the superheater 14, it is supplied to the steam turbine 21 through a high pressure steam pipe 27.

On the other hand, the water separated in the high pressure drum 13 is recycled through the high pressure descending pipe 25, the high pressure evaporator 12 and the high pressure drum 13. The liquid level of feedwater in each of the high pressure drum 13 and the low pressure drum 9 is controlled by operating a high pressure drum feed valve 28 and a low pressure drum feed valve 29, respectively. In FIG. 13, reference numeral 30 denotes a condenser, and reference numeral 31 denotes a generator.

The steam which has been used for rotation of the rotor of the steam turbine 21 is changed into water in the condenser 30. The resultant water is again supplied as the feedwater WF through the feedwater pipe 17 to the waste heat recovery boiler 5 by means of the feedwater pump 16. However, the feedwater WF in the feedwater pipe 17 has a low temperature of about 34° C.

Therefore, if the feedwater WF having such a low temperature is supplied to the low pressure economizer 7, low temperature corrosion will take place in the low pressure economizer 7. For this reason, it is necessary to raise the temperature of the feedwater to a predetermined temperature at which no low temperature corrosion occurs by mixing the feedwater WF with part of the high temperature water WR passing through the high pressure feedwater pipe 23.

For this purpose, part of the high temperature water WR flowing in the high pressure feedwater pipe 23 is supplied from the outlet of the boiler feedwater pump 22 to the feedwater pipe 17 through a recycle channel 33 having a recycle flow regulating valve 32, thereby preventing the occurrence of low temperature corrosion within the low pressure economizer 7.

It is to be noted that the waste heat recovery boiler 5 in the schematic system view of FIG. 13 is shown by way of example as employing as the fuel F a fuel, such as LNG, which exhausts a clean gas containing no sulfur. To cope with the recent trend toward diversification in the kinds of fuel employed, the waste heat recovery boiler 5 may of course employ as the fuel F a dirty oil fuel such as naphtha which contains sulfur.

There are some instances where a waste heat recovery boiler which can be adapted to various kinds of fuel is planned and utilizes the aforesaid structure of the prior art waste heat recovery boiler 5. In such an instance, if the heat transfer area of the low pressure economizer 7 is designed on the assumption that a fuel is used which exhausts a gas containing no SOx (hereinafter referred to as a "clean gas"), it is necessary to raise the temperature of the feedwater at the inlet of the low pressure economizer 7 in order to prevent low temperature corrosion from occurring during the recovery of the heat possessed by the waste gas. This necessity involves the following shortcomings which will be described with reference to FIGS. 14A and 14B.

Figure 14A:
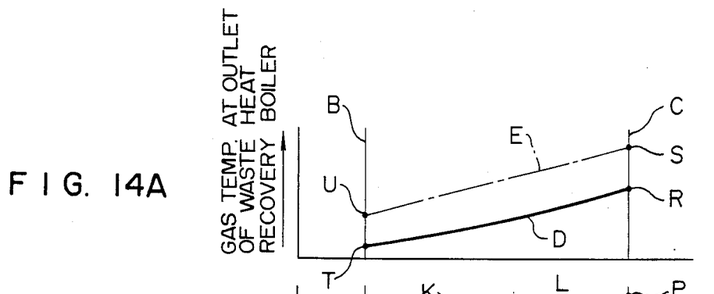
FIG. 14A is a characteristic chart showing characteristic curves relative to the temperature of the exhaust gas at the outlet of a low pressure economizer.
Figure 14B:
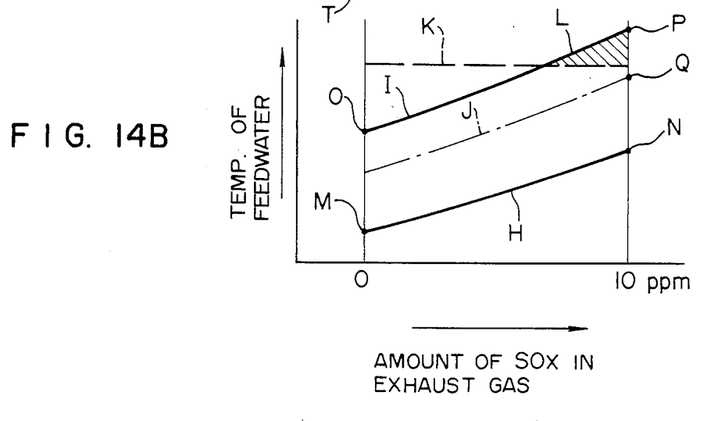
FIG. 14B is a characteristic chart showing characteristic curves relative to the temperature of the feedwater in a low pressure economizer.

FIGS. 14A and 14B are characteristic charts in which their horizontal axes uniformly represent the amount of SOx contained in the exhaust gas G, with the vertical axes of FIGS. 14A and 14B representing the temperature of the exhaust gas at the outlet of the waste heat recovery boiler 5 and the temperature of the feedwater, respectively. In FIGS. 14A and 14B, a common vertical line B which corresponds to a clean gas represents the fact that the amount of SOx is zero, while a common vertical line C which corresponds to a dirty gas represents the fact that the amount of SOx is 10 ppm.

Curve D in FIG. 14A represents the temperature of the exhaust gas at the outlet of the low pressure economizer 7 when the heat transfer area of the low pressure economizer 7 is increased, with curve E in the same figure representing the temperature of the exhaust gas at the outlet of the low pressure economizer 7 when the heat transfer area of the low pressure econimizer 7 is reduced.

In FIG. 14B, curve H represents the temperature of the feedwater at the inlet of the low pressure economizer 7, curve I representing the temperature of the feedwater at the outlet of the low pressure economizer 7 when the heat transfer area of the low pressure economizer 7 is increased, curve J representing the temperature of the feedwater at the outlet of the low pressure economizer 7 when the heat transfer area of the low pressure economizer 7 is reduced, curve K representing the steam generation temperature at which steam is generated in the low pressure economizer 7, and a shaded portion L representing the steam generation zone in which steam is generated in the low pressure economizer 7.

As described previously, in order to prevent low temperature corrosion from occurring in the low pressure economizer 7 when either of a clean or dirty gas is exhausted, t is necessary to increase the flow rate of the high temperature water WR flowing in the recycle channel 33 shown in FIG. 13. However, when the flow rate of the high temperature water WR is increased, the temperature of the feedwater at the inlet of the low pressure economizer 7 rises along curve H from point M to point N.

Accordingly, the temperature of the feedwater at the outlet of the low pressure economizer 7 rises from point O to point P as indicated by curve I, and the temperature within the low pressure economizer 7 reaches the steam generation zone indicated as the shaded portion L. This temperature increase results in the problem that the low pressure economizer 7 is damaged owing to the occurrence of adverse phenomena such as steaming, unstable flow, water hammer and so forth.

In addition, the increase in the flow rate of the high temperature water WR involves the drawback of an increase in the capacity of the boiler feedwater pump 22. It is estimated that the pump capacity of the boiler feedwater pump 22 with respect to the dirty gas is about two times greater than that with respect to the clean gas.

On the other hand, when the heat transfer area of the low pressure economizer 7 is reduced from curve I to curve J in order to prevent the phenomenon of steaming in the low pressure economizer 7, the temperature of the feedwater at the outlet of the low pressure economizer 7 falls from point P to point Q, thereby enabling prevention of the phenomenon of steaming. Since the temperature of exhaust gas at the outlet of the waste heat recovery boiler 5 rises from point R to point S, the occurrence of low temperature corrosion can also be prevented.

However, when the clean gas is employed, the temperature of the exhaust gas at the outlet of the waste heat recovery boiler 5 rises from point T to point U in FIG. 14A, and thus in the water heat recovery boiler which is planned on condition that the clean gas is used, the temperature of the exhaust gas at its outlet is raised by about 15° C. Therefore, since a large quantity of heat to be recovered is dissipated in the atmosphere, the aforesaid prior art arrangement is uneconomical from the viewpoint of heat recovery.

SUMMARY OF THE INVENTION

It is, therefore, an object of the present invention to provide a waste heat recovery boiler in which it is possible to eliminate the above-described problems involved in the prior art, which achieves the maximum efficiency of heat recovery, and which can be safely operated since the phenomenon of steaming in a heat exchanger is eliminated irrespective of whether the kind of exhaust gas is a dirty gas or a clean gas.

To achieve the above and other objects of the present invention, in accordance with the present invention, there is provided a waste heat recovery boiler comprising heat exchange rate switching means for controlling the rate of heat exchange between the exhaust gas and feedwater in a heat exchanger by changing the state of the feedwater in accordance with the concentration of sulfur oxides in the exhaust gas, thereby maintaining the temperature at which low temperature corrosion due to the exhaust gas is prevented in a downstream portion of the heat exchanger in the direction in which the exhaust gas flows.

BRIEF DESCRIPTION OF THE ACCOMPANYING DRAWINGS

The present invention will be more readily apparent from the following detailed description of a few preferred embodiments thereof when taken in conjunction with the accompanying drawings, in which.

DESCRIPTION OF THE PREFERRED EMBODIMENTS

Preferred embodiments of the present invention will be described below with reference to the accompanying drawings.

First of all, a first embodiment of the present invention will be described in conjunction with FIG. 1 which is a system diagram illustrating the overall system of the first embodiment of a combined power plant in accordance with the present invention, as well as FIG. 2 which is an enlarged system diagram of the essential portion of the combined power plant shown in FIG. 1.

Throughout the figures which illustrate preferred embodiments of the present invention, reference numerals 1 to 31 denote the elements corresponding to those used in the waste heat recovery boiler of the prior art shown in FIG. 13.

The first embodiment further includes a first recycle flow regulating valve 34, a first recycle channel 35, a second recycle flow regulating valve 36, a second recycle channel 37, an inlet header 38 of the low pressure economizer 7, a middle header 39 of the same, an outlet header 40 of the same, a distributor 41, an SOx sensor 42 disposed in the exhaust gas passage 6 for sensing the concentration of SOx contained in the exhaust gas G, and a control section 43 for outputting a valve-opening command signal to the first recycle flow regulating valve 34 and the second recycle flow regulating valve 36 on the basis of a detection signal supplied from the SOx sensor 42, the control section 43 having a valve switching means 44 in its interior. An SOx reference value (for example, 0.1 ppm) is previously set in a storage portion (not shown) of the control section 43 in order to determining whether the kind of exhaust gas is a clean gas or a dirty gas. The control section 43 compares that reference value with the detected value supplied from the SOx sensor 42. If the detected value is less than the reference value, the control section 43 determines that the kind of exhaust gas is a clean gas, and supplies valve-opening command signals (to be described later) to the first and second recycle flow regulating valves 34 and 36. On the other hand, if the detected value is not less than the reference value, the control section 43 determines that the kind of exhaust gas is a dirty gas, and supplies to the same valves 34 and 36 valve-opening command signals which will be described later.

By way of example, the first embodiment is arranged in such a manner that the SOx concentration in the exhaust gas is directly detected by the SOx sensor 42 to determine whether the kind of exhaust gas is a clean gas or a dirty gas. However, the SOx sensor 42 need not necessarily be incorporated. For example, if a gas fuel such as LNG which contains no sulfur is employed, the resultant exhaust gas is a clean gas, while, if an oil fuel such as naphtha which contains sulfur is employed, a dirty gas is produced. Therefore, suitable valve switching means may be disposed to supply valve-opening command signals to the recycle flow regulating valves 34 and 36 according to the kind of fuel employed.

Figure 1:
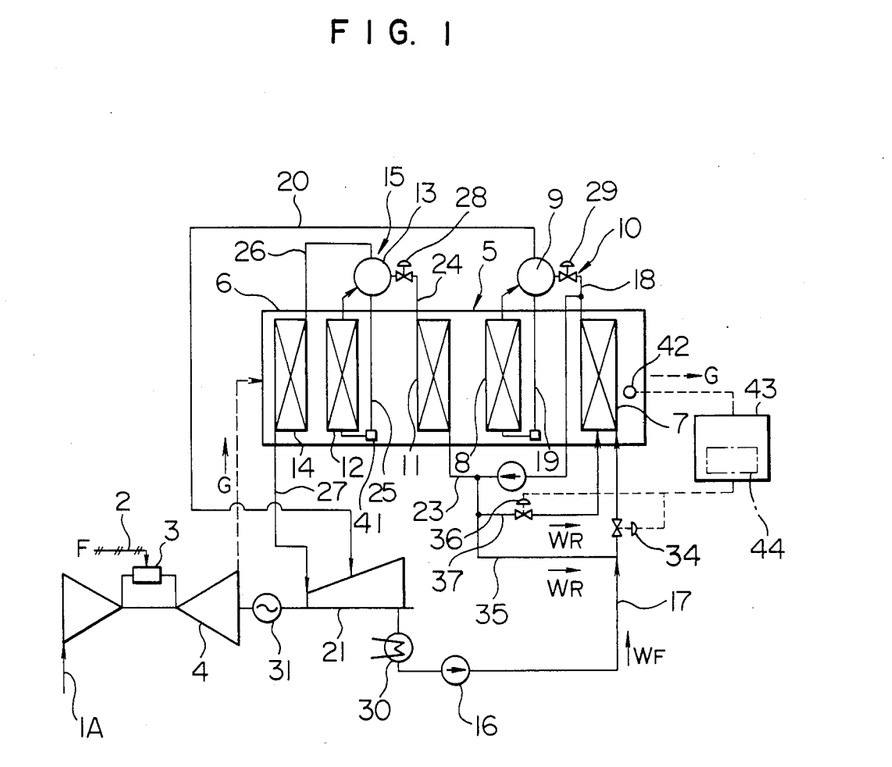
FIG. 1 is a system diagram illustrating the overall system of one preferred embodiment of a combined power plant in accordance with the present invention.
Figure 2:
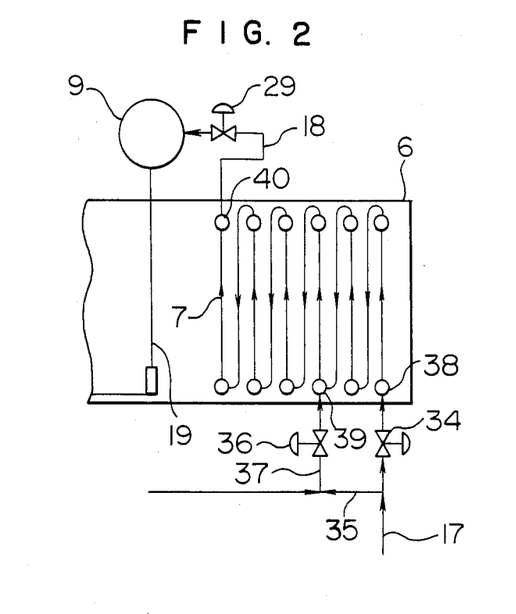
FIG. 2 is a system diagram illustration on an enlarged scale of the essential portion of the combined power plant shown in FIG. 1.

In FIGS. 1 and 2, if the exhaust gas G is a clean gas, the second recycle flow regulating valve 36 is closed to stop the supply of the high temperature water WR to the second recycle channel 37. In the meantime, the first recycle flow regulating valve 34 is opened, and the high temperature water WR at the outlet of the boiler feedwater pump 22 is supplied to the first recycle channel 35, mixed with the feedwater WF in the feedwater pipe 17, and supplied to the inlet header 38 of the low pressure economizer 7.

As more specifically shown in FIG. 2, the high temperature water WR in the first recycle channel 35 and the feedwater WF in the feedwater pipe 17 are made to flow through the inlet header 3 of the low pressure economizer 7 to the outlet header 40. Thus, all the heat transfer surfaces of the low pressure economizer 7 are employed to effect heat recovery of from point M to point 0 shown in FIG. 14B.

On the other hand, if the exhaust gas G is a dirty gas, the first recycle flow regulating valve 34 is closed to stop the supply of the high temperature water WR to the first recycle channel 35. In the meantime, the second recycle flow regulating valve 36 is opened, and the high temperature water WR at the outlet of the boiler feedwater pump 22 is supplied to the second recycle channel 37, mixed with the feedwater WF in the feedwater pipe 17, and supplied to the middle header 39 of the low pressure economizer 7.

As more specifically shown in FIG. 2, the high temperature water WR in the second recycle channel 37 and the feedwater WF in the feedwater pipe 17 are made to flow through the middle header 39 of the low pressure economizer 7 to the outlet header 40. Thus, the heat transfer surface of the low pressure economizer 7 is partially employed to reduce the heat transfer area thereof as compared with that used for the clean gas.

If the heat transfer area of the low pressure economizer 7 is reduced in this manner, it is possible to effect heat recovery of from point N to point Q shown in FIG. 14B as well as to prevent steam from being produced in the low pressure economizer 7.

It is to be noted that, in the case of the dirty gas, although no feedwater is supplied to the area defined between the inlet header 38 and the middle header 39 in the low pressure economizer 7, there is no problem from the strength viewpoint since the temperature of the exhaust gas G is sufficiently low.

As described above, in order to solve the shortcomings involved in the prior art, the first embodiment is arranged so that, when the exhaust gas G is a clean gas, all the heat transfer surface of the low pressure economizer 7 is employed to enhance the efficiency of heat recovery. When the exhaust gas G is a dirty gas, the area of the heat transfer surface of the low pressure economizer 7 is reduced to prevent steaming from occurring in the low pressure economizer 7.

Figure 3:
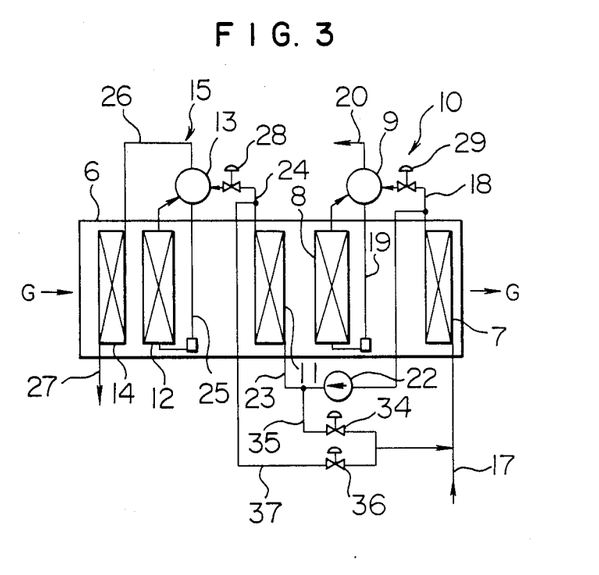
FIG. 3 is a system diagram of another embodiment of the combined power plant in the accordance with the present invention.

FIG. 3 is a system diagram illustrating a second preferred embodiment of the present invention.

The second embodiment differs from the first embodiment in the following respects. In the first embodiment, the inlets of both the first recycle channel 35 and the second recycle channel 37 are made to branch from the outlet of the boiler feedwater pump 22, and the outlets of the channels 35 and 37 are respectively connected to the inlet header 38 and the middle header 39 of the low pressure economizer 7. In contrast, in the second embodiment, the inlet of the first recycle channel 35 is made to branch from the outlet of the boiler feedwater pump 22, while the inlet of the second recycle channel 37 is made to branch from the outlet of the higher pressure economizer 11. The outlets of the channels 35 and 37 are both connected to the inlet header 38 of the low pressure economizer 7.

Accordingly, when the exhaust gas G is a clean gas, the first recycle flow regulating valve 34 is opened and the second recycle flow regulating valve 36 is closed, by a command signal from the switching means (not shown). Then, the high temperature water WR through the first recycle channel 35 and the feedwater WF through the feedwater pipe 17 are mixed and supplied to the low pressure economizer 7. On the other hand, if the exhaust gas G is a dirty gas, the first recycle flow regulating valve 34 is closed and the second recycle flow regulating valve 36 is opened. Then, the high temperature water WR through the second recycle channel 37 and the feedwater WF through the feedwater pipe 17 are mixed and supplied to the low pressure economizer 7.

In other words, the second embodiment is arranged in such a manner that a position at which the high temperature water WR is extracted is switched between the outlet of the high pressure economizer 11 and the outlet of the low pressure economizer 7 in order to limit an increase in the flow rate of the high temperature water WR. More specifically, when the exhaust gas G is a clean gas, the high temperature water WR at the outlet of the low pressure economizer 7 is recycled to the first recycle channel 35, since the temperature of the feedwater at the inlet of the low pressure economizer 7 may be low. On the other hand, when the exhaust gas G is a dirty gas which requires that the temperature of the feedwater at the inlet of the low pressure economizer 7 be made high, the high temperature water WR at the outlet of the high pressure economizer 11 which is higher in temperature than that at the outlet of the low pressure economizer 7 is recycled through the second recycle channel 37. Thus, in the case of the dirty gas, since the temperature of the high temperature water WR is high, it is possible to limit an increase in the recycle flow in the second recycle channel 37 and hence to reduce the capacity of the boiler feedwater pump 22.

Figure 4:
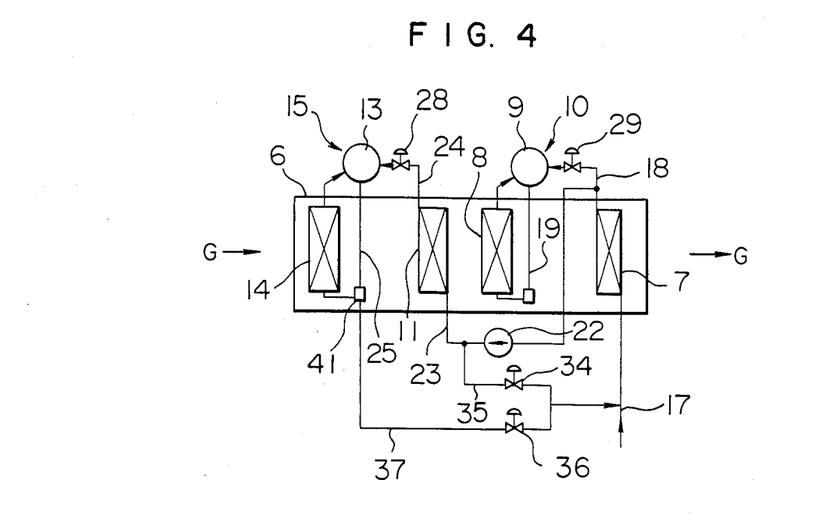
FIG. 4 is a system diagram of another embodiment of the present invention.

FIG. 4 is a system diagram illustrating a third preferred embodiment of the present invention.

The third embodiment differs from the aforesaid second embodiment in that the high temperature water WR is extracted at the distributor 41 of the high pressure descending pipe 25, and supplied to the second recycle channel 37.

In the third embodiment, when the exhaust gas G is a clean gas, the high temperature water WR at the outlet of the boiler feedwater pump 22 is supplied to the low pressure economizer 7 through the first recycle channel 35. On the other hand, when the exhaust gas G is a dirty gas, still higher temperature water WR is supplied from the distributor 41 through the second recycle channel 37 to the low pressure economizer 7, thereby preventing steaming and low temperature corrosion from occurring in the low pressure economizer 7. In addition, since the high temperature water WR may be supplied through the second recycle channel 37 at a reduced flow rate, it is possible to reduce the capacity of the boiler feedwater pump 22.

Figure 5:
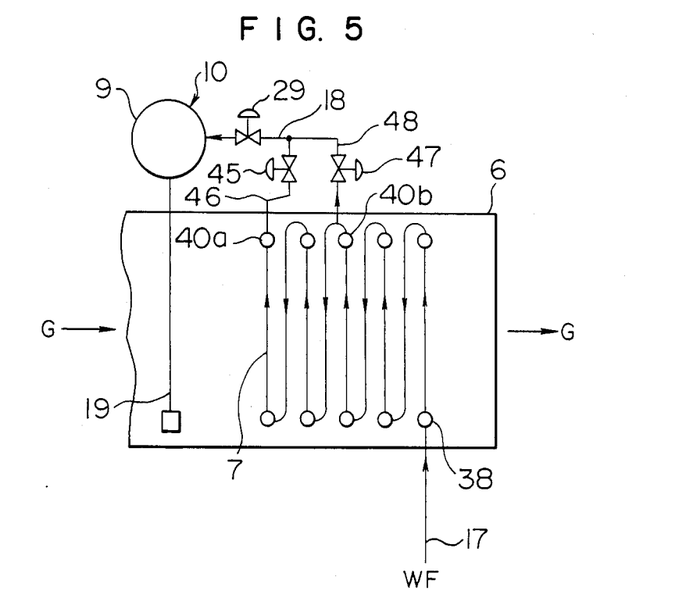
FIG. 5 is a system diagram of another embodiment of the present invention.

FIG. 5 is a system diagram illustrating a fourth preferred embodiment of the present invention.

The fourth embodiment differs from the first to third embodiments in the following respect. In the first to third embodiments, the first recycle channel 35 and the second recycle channel 37 are disposed in parallel on the inlet side of the low pressure economizer 7 so that the heat transfer area may be changed. In contrast, in the fourth embodiment, a first extraction channel 46 having a first extraction flow regulating valve 45 is connected to a final outlet header 40a of the low pressure economizer 7, while a second extraction channel 48 having a second extraction flow regulating valve 47 is connected to a middle header 40b of the low pressure economizer 7 on the outlet side thereof. As illustrated, the other ends of these extraction channels 46 and 48 are connected to the drum feedwater pipe 18.

Therefore, in this embodiment, when the exhaust gas G is a clean gas, the second extraction flow regulating valve 47 is closed to stop the extraction of the feedwater in the second extraction channel 48. Then, the first extraction flow regulating valve 45 is opened to extract the feedwater from the final outlet header 40a.

On the other hand, when the exhaust gas G is a dirty gas, the first extraction flow regulating valve 45 is closed to stop the extraction of the feedwater in the first extraction channel 48. Then, the second extraction flow regulating valve 47 is opened to extract the feedwater from the middle outlet header 40b.

In this manner, the heat transfer area of the low pressure economizer 7 can be changed, depending upon whether the exhaust gas G is a clean gas or a dirty gas.

Thus, it is possible to prevent steaming and low temperature corrosion from occurring in the low pressure economizer 7, as well as to recover the heat possessed by the exhaust gas G at the maximum efficiency.

It is to be noted that, in the case of a dirty gas, no feedwater flows in the area defined between the middle outlet header 40b of the low pressure economizer 7 and the final outlet header 40a thereof. However, there is no risk of damaging the heat transfer surface of the economizer 7 since the gas temperature on the inlet side of the low pressure economizer 7 is low.

Figure 6:
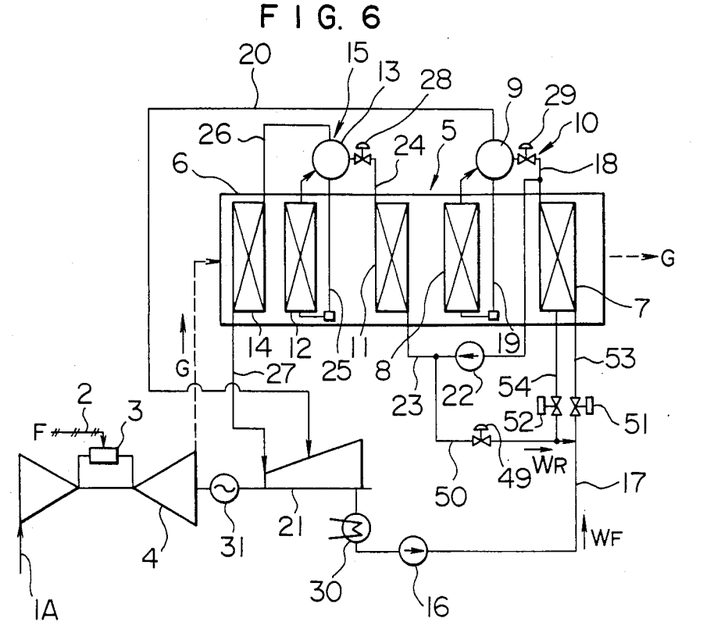
FIG. 6 is a system diagram of another embodiment of the present invention.

FIG. 6 is a system diagram illustrating a fifth preferred embodiment of the present invention.

The fifth embodiment differs from the previously-described first embodiment in that a main recycle channel 50 having a flow regulating valve 49 extends from the outlet side of the boiler feedwater pump 22 to the feedwater pipe 17. The downstream end of the main recycle channel 50 is provided with an inlet header feedwater pipe 53 having a first stop valve 51 and a middle header feedwater pipe 54 having a second stop valve 52. As illustrated, the inlet header feedwater pipe 53 is connected to the inlet header of the low pressure economizer 7, and the middle header feedwater pipe 54 is connected to the middle header of the low pressure economizer 7.

In the fifth embodiment, when the exhaust gas G is a clean gas, the first stop valve 51 is opened and the second stop valve 52 is closed, and the high temperature water WR supplied through the main recycle channel 50 is mixed with the feedwater WF. The mixed flow is supplied through the inlet header feedwater pipe 53. When the exhaust gas G is a dirty gas, the first stop valve 51 is closed and the second stop valve 52 is opened, and the high temperature water WR supplied through the main recycle channel 50 is mixed with the feedwater WF. The mixed flow is supplied through the middle header feedwater pipe 54.

Figure 7:
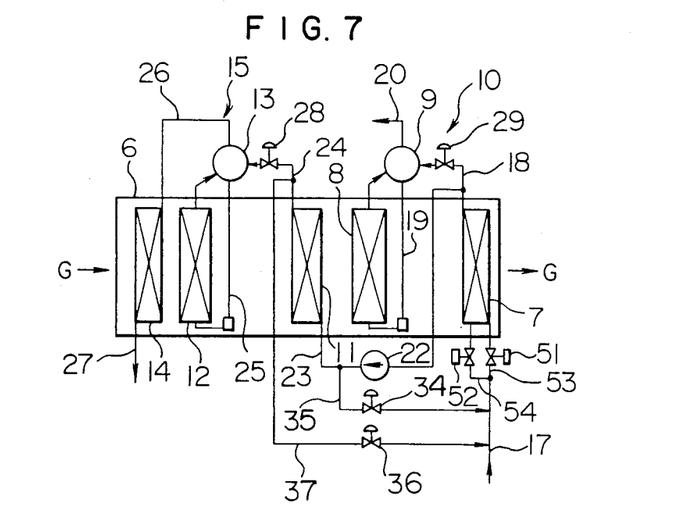
FIG. 7 is a system diagram of another embodiment of the present invention.

FIG. 7 is a system diagram illustrating a sixth preferred embodiment of the present invention.

The sixth embodiment differs from the second embodiment (refer to FIG. 3) in that, as in the fifth embodiment, the inlet header feedwater pipe 53 having the first stop valve 51 and the middle header feedwater pipe 54 having the second stop valve 52 are incorporated.

With the arrangement of the sixth embodiment, it is possible to provide further fine control over the low pressure economizer 7 by effecting suitable switchover between the two flow regulating valves 34 and 36 as well as the two stop valves 51 and 52.

More specifically, the following control is enabled according to the nature of the exhaust gas G.

(1) The first recycle flow regulating valve 34 is opened and the second recycle flow regulating valve 36 is closed so as to control the opening and closing of the first stop valve 51 and the second stop valve 52.

(2) The first recycle flow regulating valve 34 is closed and the second recycle flow regulating valve 36 is opened so as to control the opening and closing of the first stop valve 51 and the second stop valve 52.

(3) The first stop valve 51 is opened and the second stop valve 52 is closed so as to control the opening and closing of the first recycle flow regulating valve 34 and the second recycle flow regulating valve 36.

(4) The first stop valve 51 is closed and the second stop valve 52 is opened so as to control the opening and closing of the first recycle flow regulating valve 34 and the second recycle flow regulating valve 36.

Figure 8:
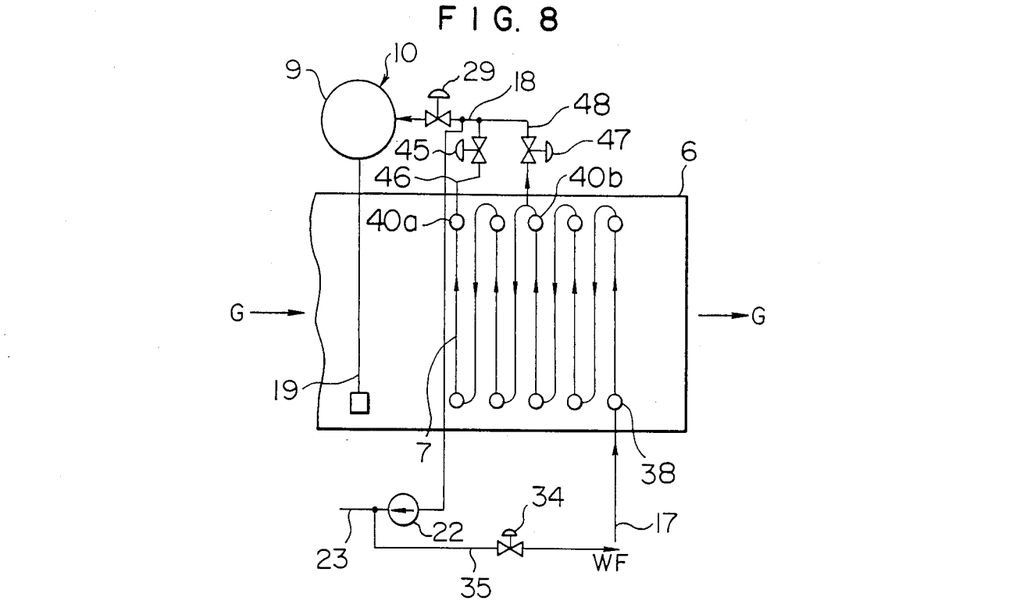
FIG. 8 is a system diagram of another embodiment of the present invention.

FIG. 8 is a system diagram illustrating a seventh preferred embodiment of the present invention.

The seventh embodiment differs from the previously-described fourth embodiment (refer to FIG. 5) in that, although the boiler of the fourth embodiment has a single pressure stage, the seventh embodiment has a plurality of pressure stages. More specifically, the boiler feedwater pump 22 and the high pressure feedwater pipe 23 are incorporated, and the high temperature water WR is partially supplied through the recycle channel 35, and is mixed with the feedwater WF.

Figure 9:
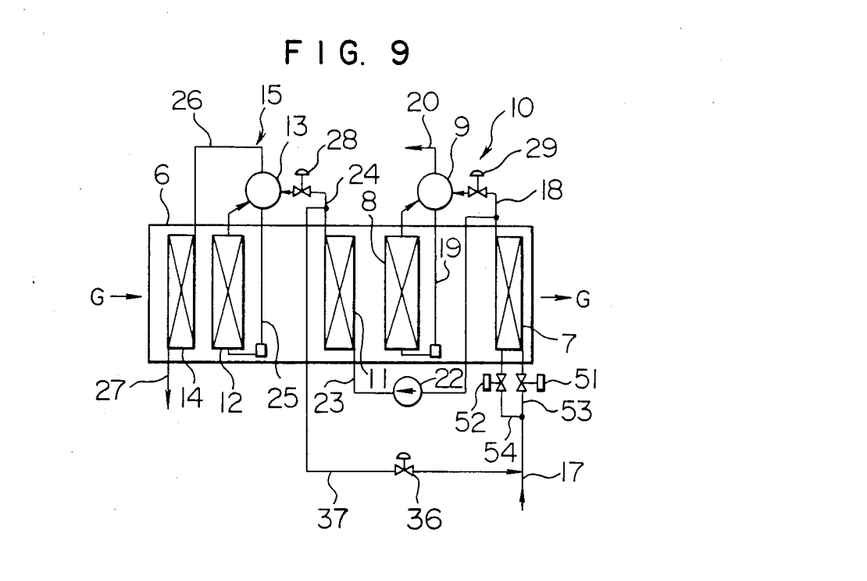
FIG. 9 is a system diagram of another embodiment of the present invention.

FIG. 9 is a system diagram illustrating an eighth preferred embodiment of the present invention.

The eighth embodiment differs from the above-described sixth embodiment (refer to FIG. 7) in that the recycle line extending from the outlet of the boiler feedwater pump 22 is omitted, whereby the high temperature water WR is partially recycled through the outlet of the high pressure economizer 11.

Figure 10:
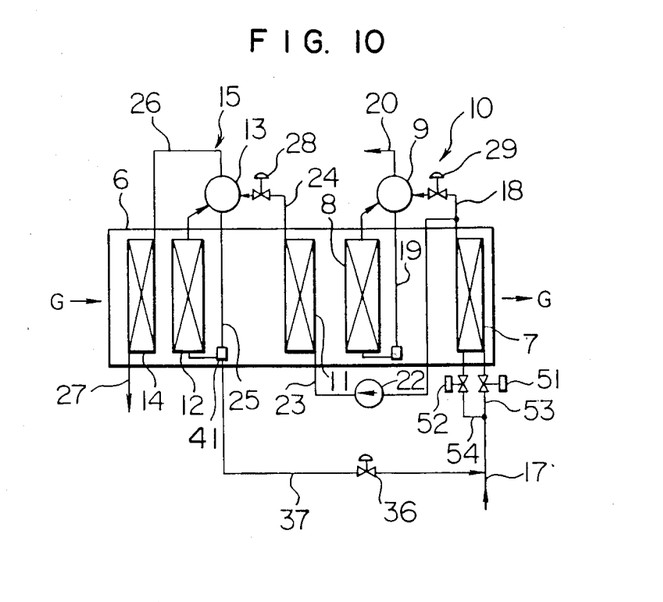
FIG. 10 is a system diagram of another embodiment of the present invention.

FIG. 10 is a system diagram illustrating a ninth preferred embodiment of the present invention. The ninth embodiment differs from the above-described eighth embodiment (refer to FIG. 9) in that the high temperature water WR is partially recycled via the distributor 41 of the high pressure descending pipe 25.

Figure 11:
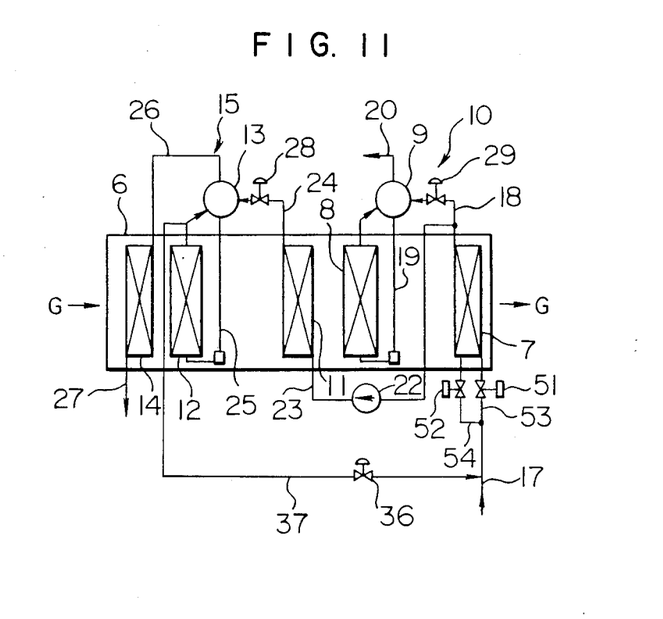
FIG. 11 is a system diagram of another embodiment of the present invention.

FIG. 11 is a system diagram illustrating a tenth preferred embodiment of the present invention. The tenth embodiment differs from the above-described eighth embodiment (refer to FIG. 9) in that a high temperature fluid (a mixture of steam and the high temperature water WR) is partially recycled through the outlet of the high pressure evaporator 12.

Figure 12:
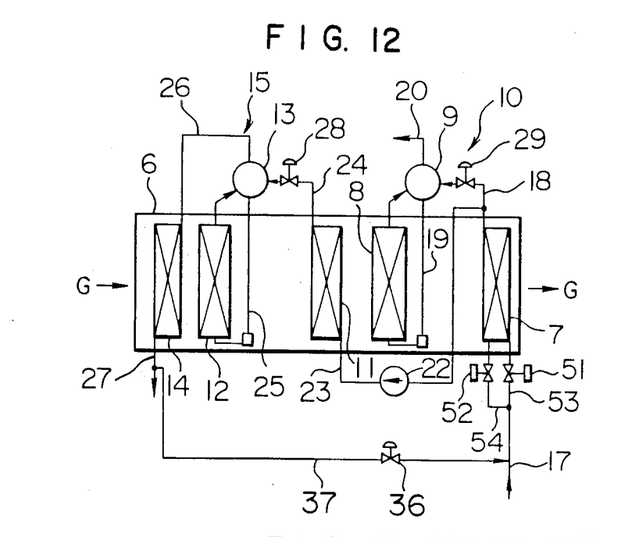
FIG. 12 is a system diagram of another embodiment of the present invention.

FIG. 12 is a system diagram illustrating an eleventh preferred embodiment of the present invention. The eleventh embodiment differs from the above-described eighth embodiment in that high pressure steam is partially recycled through the outlet of the high pressure steam pipe 27.

In the eighth to eleventh embodiments in which a fluid having a still higher temperature is recycled, the flow rate of recycled fluid can be reduced.

Although some of the above-described embodiments have two recycle lines, two or more recycle lines may of course be provided.

Also, some of the above-described embodiments have two positions at which the feedwater is supplied or extracted. However, more than two feedwater supply positions and/or feedwater extracting positions may be provided.

Further, by way of example, the economizer of the low pressure boiler has specifically been described in the explanation of the respective embodiments. However, it is of course possible to control other heat exchangers in a similar manner to that of the abovedescribed embodiments.

Each of the embodiments of the present invention provides the following advantages.

(1) The heat transfer area of the heat exchanger can be adjusted by changing the position at which the feedwater is supplied to or extracted from the heat exchanger in correspondence with the kind of fuel employed. Accordingly, the maximum efficiency of heat recovery can be achieved for each kind of fuel. It is estimated that heat recovery is improved by about 5% as compared with the prior art waste recovery boiler, so that annual fuel costs can be reduced by 1.5 billion yen per four boilers. (This estimation is based on the condition that a 1,000-MW plant (including four waste heat recovery boilers) operates for an operating time of 6,000 hours/year at a plant efficiency (2) In addition, it is possible to limit the increase in capacity of the boiler feedwater pump irrespective of the presence or absence of SOx in the exhaust gas.

(Examples of Estimations)

1. If the fuel for the gas turbine is LNG (containing no SOx in its exhaust gas), the shaft power of the boiler feedwater pump is 600 KW.

2. If the fuel for the gas turbine is naphtha (containing SOx in its exhaust gas), (1) when the high temperature water WR is extracted through the outlet of the low pressure economizer, the shaft power of the boiler feedwater pump is 1,200 KW; and (2) when the high temperature water WR is extracted through the outlet of the high pressure economizer, the shaft power of the boiler feedwater pump is 610 KW.

Therefore, in accordance with the present invention, it is possible to reduce the shaft power of th boiler feedwater pump to substantially half the normal level and hence to reduce the operating cost of the plant.

Accordingly, in accordance with the present invention, whether the kind of exhaust gas is a clean gas or a dirty gas, the heat recovery of the exhaust gas can be accomplished at its maximum efficiency by eliminating the phenomenon of steaming and low temperature corrosion in the heat exchanger.

What is claimed is:

1. A waste heat recovery boiler comprising heat exchange rate switching means for controlling the rate of heat exchange between an exhaust gas and feedwater in a heat exchanger by changing the state of said feedwater in accordance with the concentration of sulfur oxides in said exhaust gas, thereby maintaining the temperature at which low temperature corrosion due to said exhaust gas is prevented in a downstream portion of said heat exchanger in the direction in which said exhaust gas flows.

2. A waste heat recovery boiler according to claim 1, wherein said heat exchange rate switching means is a heat transfer area changing means capable of changing, in a plurality of steps, the heat transfer area of said heat exchanger which is allocated for said heat exchange between said exhaust gas and said feedwater.

3. A waste heat recovery boiler according to claim 2, wherein said heat transfer area changing means is a means capable of changing a position at which said feedwater is supplied to said heat exhanger.

4. A waste heat recovery boiler according to claim 2, wherein said heat transfer area changing means is a means capable of changing a position at which said feedwater is extracted from said heat exchanger.

5. A waste heat recovery boiler according to claim 1, wherein said heat exchange rate switching means is a feedwater temperature changing means capable of changing the temperature of said feedwater to be supplied to said heat exchanger.

6. A waste heat recovery boiler according to claim 5, wherein said feedwater temperature changing means includes a plurality of high temperature fluid mixing lines for mixing part of a high temperature fluid heated by said heat exchanger with said feedwater to be supplied to said heat exchanger, said plurality of high temperature mixing lines capable of being switched over therebetween to supply a high temperature fluid at a different temperature.

7. A waste heat recovery boiler according to claim 1, wherein said heat exchange rate switching means is constituted by a combination of heat transfer area changing means capable of changing, in a plurality of steps, the heat transfer area of said heat exchanger which is allocated for said heat exchange between said exhaust gas and said feedwater and a feedwater temperature changing means capable of changing the temperature of said feedwater to be supplied to said heat exchanger.

8. A waste heat recovery boiler according to claim 1 further including sensor means for detecting the concentration of sulfur oxides in said exhaust gas which is being circulated in said heat exchanger, said heat exchange rate switching means being arranged to be actuated in response to a detection signal of said sensor means.

* * * * *